United States Patent Office 3,168,530
Patented Feb. 2, 1965

3,168,530
PROCESS FOR THE PRODUCTION OF 4,5-SECO STEROIDS AND INTERMEDIATES
Gerard Nomine, Noisy-le-Sec, Julien Warnant, Neuilly-sur-Seine, Robert Bucourt, Clichy-sous-Bois, Michel Vignau, Neuilly-sur-Seine, Jean Jolly, Clichy-sous-Bois, and Andre Pierdet, Noisy-le-Sec, France, assignors to Roussel-UCLAF, S.A., Paris, France, a corporation of France
No Drawing. Filed Oct. 22, 1962, Ser. No. 232,310
Claims priority, application France, Jan. 22, 1960, 816,402; May 18, 1960, 827,567; July 8, 1960, 832,449
13 Claims. (Cl. 260—326.3)

The present invention relates to an improvement in the process for the preparation of derivatives of cyclopentano-octahydronaphthalene and the novel intermediates thus obtained.

More particularly, it relates to a process for the preparation of octahydronaphthalene compounds of the formula V:

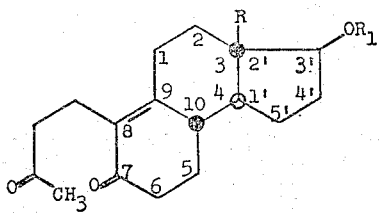

V wherein R represents a radical selected from the group consisting of alkyl having from 1 to 18 carbon atoms, alkenyl having from 2 to 6 carbon atoms, phenylalkoxyalkyl having from 8 to 18 carbon atoms, and aralkyl having from 7 to 18 carbon atoms, and $R_1$ represents a member selected from the group consisting of hydrogen and the acyl radical of an organic carboxylic acid having from 1 to 18 carbon atoms.

This application is a continuation-in-part of application Serial No. 110,328, filed May 16, 1961, filed in our names, and now abandoned, and application Serial No. 96,062, filed January 19, 1961, now U.S. Patent No. 3,115,507, filed in the names of Gerard Nomine, Robert Bucourt and Andre Pierdet, both commonly assigned.

In commonly assigned United States Patent No. 3,019,252 there is described a process of preparation of $\Delta^{8(9)}$-3-methyl-7-oxo-8-(3'-oxo-butyl)-3,4-[3'-acyloxy-cyclopentano-(2',1')]-octahydronaphthalene compounds of the Formula V(c):

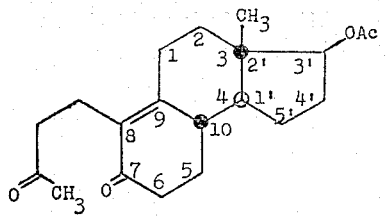

V(c)

where Ac represents an acyl radical of an organic hydrocarbon carboxylic acid having from 1 to 18 carbon atoms, starting from $\Delta^{9(10)}$-3-methyl-7-oxo-3,4-[3'-acyloxy-cyclopentano-(2',1')]-octahydronaphthalene compounds of Formula I(c):

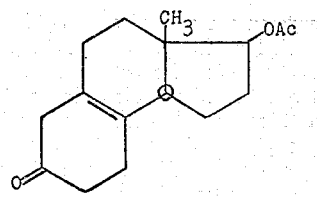

I(c)

Ac having here and in the following the above cited significance.

The process of the said patent consisted in condensing a compound of the Formula I(c) with 1,3-dichloro-2-butene in the presence of an alkaline condensation agent in such a manner as to form $\Delta^{9(10)}$-3-methyl-7-oxo-8-(3'-chloro-2'-butenyl)3,4 - [3' - acyloxy-cyclopentano-(2',1')]-octahydronaphthalene compounds of Formula II(c)A:

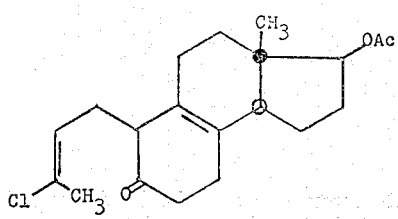

II(c)A which, upon hydrolysis, furnishes the desired dione of Formula V(c).

Compounds of the Formula V(c) are important intermediate products in the synthesis of steroids and analogous compounds. After reduction of the 8(9)-ethylene bond and intramolecular condensation between the carbonyl in the 7-position and the terminal methyl group of the side chain, different esters of 19-nor-testosterone are obtained.

An improvement of the above-mentioned process was the object of another commonly assigned United States Patent No. 3,050,550.

According to the process of this patent a chlorinated derivative of the Formula II(c)A is subjected to the action of hydrochloric acid in such a manner as to cause a migration of the double bond in the 9(10) position to the 8(9) position and thereafter the isomerized chloride of the Formula II(c)B:

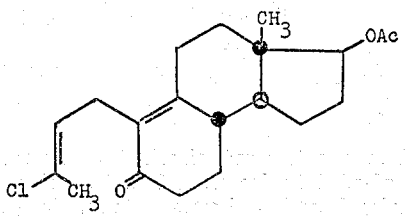

II(c)B is hydrolyzed under the same conditions as above to yield compounds of Formula V(c). By this process a considerable increase in the yields of the last step of the preparation of compounds of Formula V(c) is obtained.

In parent application Serial No. 96,062, now U.S. Patent No. 3,115,507 there is described a process for the obtention of $\Delta^{8(9)}$-3-substituted-7-oxo-3,4-[3'-substituted-cyclopentano-(2',1')] - octahydronaphthalene compounds of the formula:

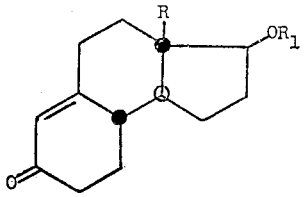

wherein R represents a radical selected from the group consisting of alkyl having from 2 to 18 carbon atoms, alkenyl having from 2 to 6 carbon atoms, phenylalkoxyalkyl having from 8 to 18 carbon atoms, and aralkyl having from 7 to 18 carbon atoms, and particularly when R represents n-propyl, and $R_1$ represents a member selected from the group consisting of hydrogen and the acyl radical of an organic carboxylic acid having from 1 to 18 carbon atoms, which compounds are utilized in the production of corresponding 13β-substituted-18,19-di-nor-testosterones.

It is an object of this invention to produce $\Delta^{8(9)}$-(3'-oxobutyl)-cyclopentano-octahydronaphthalene compounds of the formula:

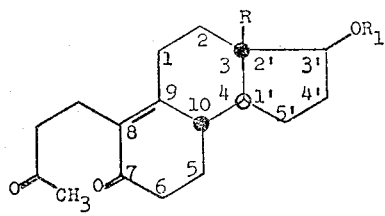

wherein R represents a radical selected from the group consisting of alkyl having from 1 to 18 carbon atoms, alkenyl having from 2 to 6 carbon atoms, phenylalkoxyalkyl having from 8 to 18 carbon atoms, and aralkyl having from 7 to 18 carbon atoms, and $R_1$ represents a member selected from the group consisting of hydrogen and the acyl radical of an organic carboxylic acid having from 1 to 18 carbon atoms, in elevated yields in all the steps by preparing an enamine of the starting compound of Formula IA or IB and thereafter condensing with a 1-halo-3-chloro-2-butene and hydrolyzing.

Another object of this invention is the production of the intermediate enamines of $\Delta^{8(9)}$-3-substituted-7-oxo-3,4-[3' - substituted-cyclopentano - (2',1')] - octahydronaphthalene compounds, said enamines having the formula:

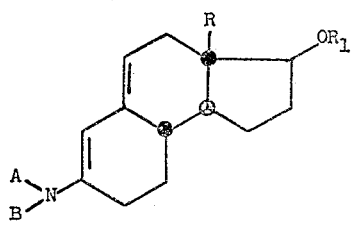

wherein R represents a radical selected from the group consisting of alkyl having from 1 to 18 carbon atoms, alkenyl having from 2 to 6 carbon atoms, phenylalkoxyalkyl having from 8 to 18 carbon atoms, and aralkyl having from 7 to 18 carbon atoms, $R_1$ represents a member selected from the group consisting of hydrogen and the acyl radical of an organic carboxylic acid having from 1 to 18 carbon atoms, A by itself represents a radical selected from the group consisting of an alkyl radical having from 1 to 8 carbon atoms, an alkenyl radical having from 3 to 8 carbon atoms and an alkylol radical having from 2 to 8 carbon atoms, B by itself represents a radical selected from the group consisting of an alkyl radical having from 1 to 8 carbon atoms, an alkenyl radical having from 3 to 8 carbon atoms and an alkylol radical having from 2 to 8 carbon atoms, and A and B taken together represent a bridging radical selected from the group consisting of alkylene having from 4 to 6 carbon atoms and ethyloxyethylene.

A still further object of the invention is the production of the intermediate selected from the group consisting of (A) $\Delta^{1(9)}$-3-substituted-7-oxo-8-(3'-halo-2'-butenyl)-3,4-[3'-substituted-cyclopentano - (2',1')] - octahydronaphthalene compounds of the formula:

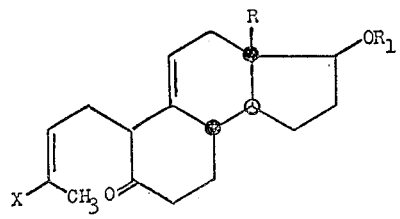

(B) $\Delta^{8(9)}$-3-substituted-7-oxo-8-(3'-halo-2'-butenyl) - 3,4-[3'-substituted - cyclopentano-(2',1')]-octahydronaphthalene compounds of the formula:

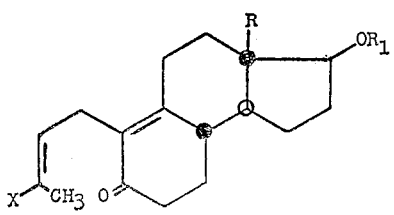

and (C) mixtures of the two isomers wherein R represents a radical selected from the group consisting of alkyl having from 1 to 18 carbon atoms, alkenyl having from 2 to 6 carbon atoms, phenylalkoxyalkyl having from 8 to 18 carbon atoms, and aralkyl having from 7 to 18 carbon atoms, $R_1$ represents a member selected from the group consisting of hydrogen and the acyl radical of an organic carboxylic acid having from 1 to 18 carbon atoms, and X represents a halide.

These and other objects of the invention will become more apparent as the description thereof proceeds.

We have now found that it is particularly advantageous to effect the above condensations to prepare the future A ring of the steroid by transforming the compounds of Formula IA or IB into the corresponding enamines and proceeding then with the condensation with a dihalogenated derivative of 2-butene. The condensation with the butene derivative furnishes in these conditions, in place of the compound of Formula II(c)A, a mixture of two position isomers. Either of these position isomers are very easily hydrolyzable into the desired dione of Formula V.

The improved process consists essentially in transforming either a $\Delta^{9(10)}$-3-substituted-7-oxo-3,4-[3'-substituted-cyclopentano-(2',1')]-octahydronaphthalene compound of the Formula IA:

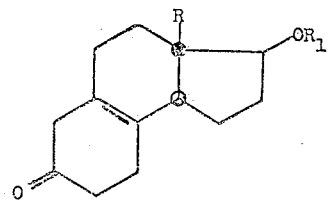

or a $\Delta^{8(9)}$-3-substituted-7-oxo-3,4-[3'-substituted-cyclopentano-(2',1')]-octahydronaphthalene compound of the Formula IB:

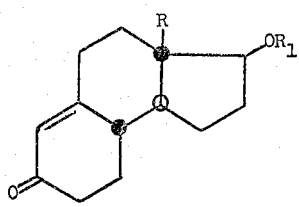

IB into the corresponding enamine of the Formula II:

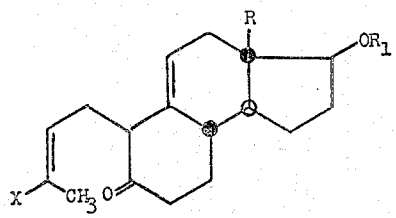

II wherein R represents a radical selected from the group consisting of alkyl having from 1 to 18 carbon atoms, alkenyl having from 2 to 6 carbon atoms, phenylalkoxyalkyl having from 8 to 18 carbon atoms, and aralkyl having from 7 to 18 carbon atoms, $R_1$ represents a member selected from the group consisting of hydrogen and the acyl radical of an organic carboxylic acid having from 1 to 18 carbon atoms, A by itself represents a radical selected from the group consisting of an alkyl radical having from 1 to 8 carbon atoms, an alkenyl radical having from 3 to 8 carbon atoms and an alkylol radical having from 2 to 8 carbon atoms, B by itself represents a radical selected from the group consisting of an alkyl radical having from 1 to 8 carbon atoms, an alkenyl radical having from 3 to 8 carbon atoms and an alkylol radical having from 2 to 8 carbon atoms, and A and B taken together represent a bridging radical selected from the group consisting of alkylene having from 4 to 6 carbon atoms and ethyloxyethylene. The enamine of Formula II, thus formed, is condensed with a 1,3-dihalo-2-butene which furnishes an intermediate selected from the group consisting of (A) $\Delta^{1(9)}$-3-substituted-7-oxo-8-(3'-halo-2'-butenyl)-3,4-[3'-substituted-cyclopentano-(2',1')] - octahydronaphthalene compounds of the formula:

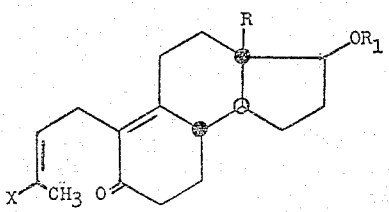

(B) $\Delta^{8(9)}$-3-substituted-7-oxo-8-(3'-halo - 2' - butenyl)-3,4-[3'-substituted-cyclopentano - (2',1')] - octahydronaphthalene compounds of the formula:

and (C) mixtures of the two isomers, wherein R and $R_1$ have the above-assigned values and X represents a halide. The condensation product is isolated after the addition of water and furnishes the intermediate. Depending upon the length of hydrolysis, either a mixture of equal parts of the two $\Delta^{8(9)}$ and $\Delta^{1(9)}$ isomers are obtained or a predominant percentage of one or the other isomer is obtained. Hydrolysis of the latter compounds of Formulas III or IV with a strong aqueous acid such as sulfuric acid leads directly to the desired dione of Formula V.

Table I is a flow diagram of the reaction.

TABLE I

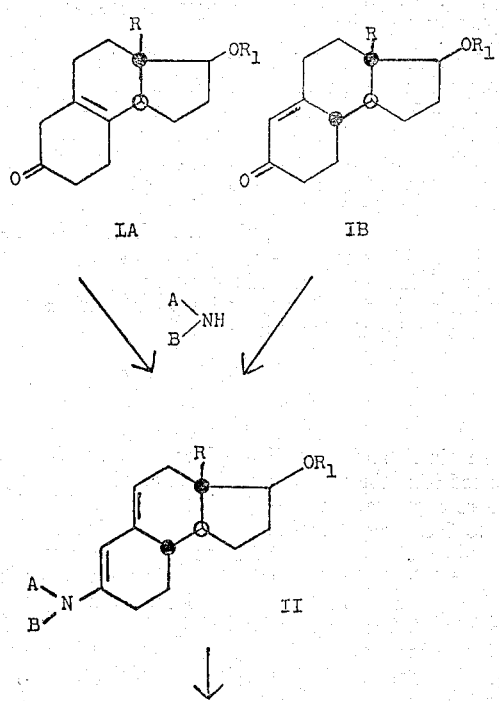

TABLE I—Continued

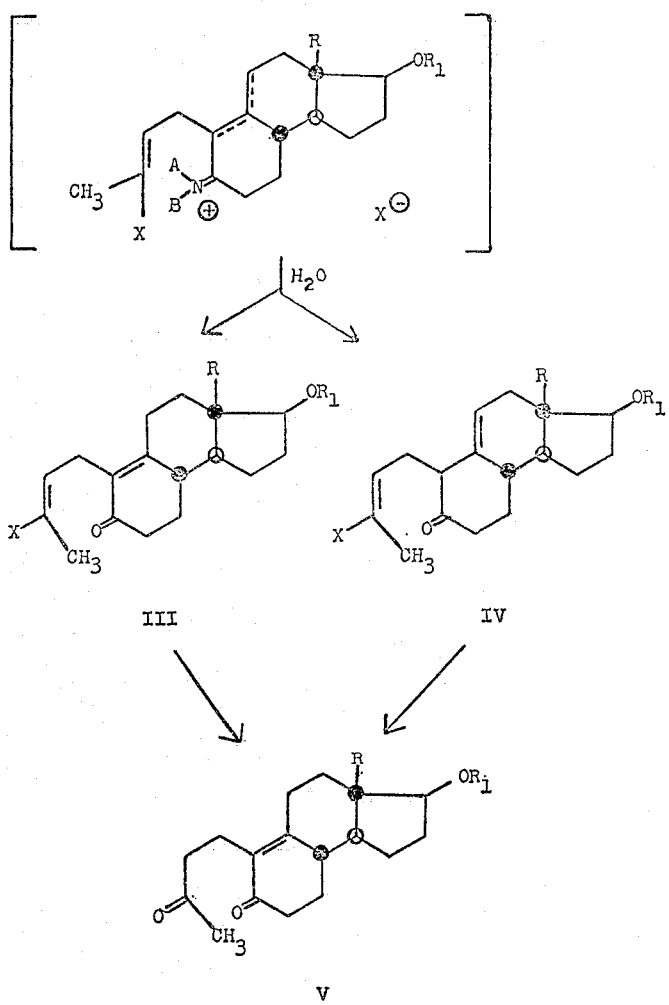

wherein R, R₁, A, B and X have the above-assigned values.

For execution of the above-described process it is necessary to react a compond of Formula IA, such as $\Delta^{9(10)}$-3-R-7-oxo-3,4-[3'-benzoyloxy-cyclopentano-(2',1')]-octahydronaphthalene or a corresponding derivative, such as the 3'-acetoxy, 3'-propionyloxy, 3'-butanoyloxy, 3'-trimethylacetoxy, 3'-phenoxyacetoxy, etc. compounds, in either the racemic or optically active form, or a compound of Formula IB, such as $\Delta^{8(9)}$-3-R-7-oxo-3,4-[3'-benzoyloxy-cyclopentano-(2',1')]-octahydronaphthalene or a corresponding derivative in either the racemic or optically active form, with a secondary amine having the formula

wherein A and B by themselves represent a radical selected from the group consisting of an alkyl radical having from 1 to 8 carbon atoms, an alkenyl radical having from 3 to 8 carbon atoms and an alkylol radical having from 2 to 8 carbon atoms, and A and B taken together represent a bridging radical selected from the group consisting of alkylene having from 4 to 6 carbon atoms and morpholino, such as, for example, piperidine, pyrrolidine, the pipecolines, α-pipecoline, β-pipecoline and γ-pipecoline, ethylaminoethanol, dipropylamine, dibutylamine, diallylamine, etc.

The secondary amnie should be chosen to give an enamine which is not too stable but one which does not decompose in solution before reacting with the dihalobutene.

This reaction is advantageously executed by mixing the required reactants and putting them in solution in an inert organic solvent such as benzene, chloroform, a lower alkanol such as methanol or ethanol, or even in a mixture of any two solvents mentioned above, and by operating preferably at room temperature or about room temperature.

In these conditions the reaction is generally terminated in about one hour and the material recovered is that which precipitated and which was an enamine of the Formula II in which the group

corresponds to a radical such as pyrrolidino, piperidino, morpholino, dipropylamino, etc.

The condensation of the enamine II with a 1,3-dihalo-2-butene such as 1-iodo-3-chloro-2-butene or the corresponding dichloro derivative is effected advantageously by placing the required reactant in solution in an inert organic solvent such as dimethylformamide and by reacting the resulting mixture at a temperature of between about 10° C. and 100° C. and preferably between about room temperature and about 70° C.

It is particularly advantageous to take as the 2-butene derivative 1-iodo-3-chloro-2-butene which can be prepared in situ in the course of the reaction by adding an alkali metal iodide such as potasisum iodide or sodium iodide to a solution of 1,3-dichloro-2-butene in an N,N-di-lower alkyl-lower alkanoylamide such as dimethylformamide.

After the condensation is completed, water is added and the quaternary complex is hydrolyzed into the $\Delta^{8(9)}$ compound of Formula III or the $\Delta^{1(9)}$ compound of Formula IV or a mixture of both isomers. These isomers are recovered by customary methods.

The condensation product is next subjected to the action of a hydrolyzing agent such as, for example, concentrated sulfuric acid which gives the desired compound V.

The hydrolysis of the 3'-chloro-2'-butenyl side chain can be effected with any hydrolyzing agent that will cause the chlorine radical to be replaced with a hydroxyl radical and will simultaneously cause the enolic hydroxy group formed to revert to the more stable ketone. It is preferable to use a concentrated aqueous solution of a strong mineral acid, such as concentrated sulfuric acid. The reaction occurs at about room temperature.

A preferred mode of execution of the process of the invention is to employ the benzoic acid ester of starting compound IA or IB, but other esters of organic carboxylic acids having 1 to 18 carbon atoms, such as the alkanoates, for example, the acetate, the trimethylacetate, the propionate, the 4,4-dimethyl-pentanoate, the laurate; the alkenoates, such as the 10-undecenoate; the cycloalkyl alkanoates, for example, the β-cyclopentylpropionate, the hexahydrobenzoate; the arylalkanoates, the phenyl-propionate; the hexahydroterephthalate; and other phenylcarboxylic acids may be used without departing from the scope of the invention.

The following examples illustrate the invention. They are, however, not to be construed as providing any limiting characteristics. The melting points are the instantaneous melting points determined on the Kofler block. The temperatures are indicated in degrees centigrade.

*Example I*

PREPARATION OF $\Delta^{8(9)}$-3-METHYL-7-OXO-8-(3'-OXOBUTYL) - 3,4[3' - BENZOYLOXY - CYCLOPENTANO-(2',1')] - OCTAHYDRONAPHTHALENE (V, $R=CH_3$, $R_1=C_6H_5CO$)

Step A: *Enamine.*—1 g. of the levorotatory enantiomorph of $\Delta^{9(10)}$-3-methyl-7 - oxo - 3,4-[3' - benzoyloxycyclopentano - (2',1')] - octahydronaphthalene (IA; $R=CH_3$, $R_1=C_6H_5CO$) specific rotation $[\alpha]_D^{20}=-26°$ (c.=1% in methanol) obtained according to Velluz et al, C. R. 250, 1084–5 (1960) was introduced under nitrogen into 1 cc. of pyrrolidine and the mixture was heated under agitation at 80–85° C. for ten minutes. The reaction mixture was then cooled to room temperature, 5.8 cc. of methanol were added and the mixture was agitated for a period of a half hour. The mixture was then iced, vacuum filtered, the product obtained purified by trituration with methanol and then dried under vacuum in order to recover 1.06 g. of $\Delta^{1(9),7(8)}$-3-methyl-7-pyrrolidino-3,4-[3' - benzoyloxy - cyclopentano-(2',1')]-hexahydronaphthalene having a melting point of 126.5° C. and a specific rotation $[\alpha]_D^{20}=+150°$ (c.=1% in benzene).

The product occurs in the form of yellow rectangular platelets and is very soluble in benzene, soluble in toluene and dimethylformamide and warm ethanol, slightly soluble in cold methanol and insoluble in water.

Ultraviolet spectra (ether):

$\lambda_{max.}$ 228mµ ε=16 900
$\lambda_{max.}$ 280mµ ε=25 400

Operating in an identical manner on the other enantiomorph of $\Delta^{9(10)}$-3-methyl-7-oxo-3,4 - [3' - benzoyloxycyclopentano - (2',1')] - octahydronaphthalene (IA, $R=CH_3$, $R_1=C_6H_5CO$) the pyrrolidino - enamine of compound IA was obtained having a melting point of 127° C. and a specific rotation $[\alpha]_D^{20}=-144°$ (c.=1% in benzene) before recrystallization.

This product occurs in the form of yellow rectangular platelets and is very soluble in benzene, soluble in ethyl acetate, and insoluble in water.

Ultraviolet spectra (ether):

$\lambda_{max.}$ 230mµ ε=16 050
$\lambda_{max.}$ 280mµ ε=26 500

The method of operation described above, when applied to the racemic product IA, $R=CH_3$, $R_1=C_6H_5CO$, furnished the racemic enamine having a melting point of 165° C.

The pyrrolidino-enamine is not described in the literature.

Step B: *Condensation.*—4 g. of sodium iodide and 10 g. of $\Delta^{1(9),7(8)}$-3-methyl-7-pyrrolidino-3,4-[3'-benzoyloxycyclopentano - (2',1')] - hexahydronaphthalene, (II, $R=CH_3$, $R_1=C_6H_5CO$,

pyrrolidino) melting at 126–127° C. and having a specific rotation $[\alpha]_D^{20}=+150°$ (benzene) were introduced into 40 cc. of dimethylformamide. The suspension was heated to 70° C. under agitation in an atmosphere of nitrogen. A pale yellow solution was obtained. Then 7.5 cc. of 1,3-dichloro-2-butene in 32.5 cc. of dimethylformamide were introduced drop by drop. An orange coloration appeared and a fine crystallization was produced. The mixture was heated for a period of 10 minutes, then water was added and it was extracted with ether. After drying, the ethereal extracts were evaporated to dryness under vacuum and the residue was redissolved in 50 cc. of isopropyl ether. The solution was heated to reflux, treated with animal charcoal, filtered, iced and evaporated to dryness under vacuum. The residue was crystallized by trituration in a small amount of isopropyl ether. The product was vacuum filtered, dried, and predominately $\Delta^{1(9)}$-3-methyl-7-oxo-8-(3'-chloro-2'-butenyl)-3,4-[3'-benzoyloxy - cyclopentano - (2',1')] - octahydronaphthalene (IV, $R=CH_3$, $R_1=C_6H_5CO$, $X=Cl$), was obtained, having a melting point (Maquenne block) of 98–99° C., and a specific rotation $[\alpha]_D^{20}=+20.5°$ (c.=0.5% in methanol).

The product occurs in the form of colorless crystals and is soluble in ether, alcohol, acetone, benzene and chloroform, insoluble in water and is decomposed by dilute aqueous acids.

*Analysis.*—$C_{25}H_{29}O_3Cl$; molecular weight=412.94. Calculated: C, 72.71%; H, 7.08%; Cl, 8.58%. Found: C, 72.6%; H, 7.0%; Cl, 8.7%.

Ultraviolet spectra (in ethanol):

$\lambda_{max.}$ 229 mµ, $E_{1cm.}^{1\%}$=390
$\lambda_{max.}$ 250 mµ, $E_{1cm.}^{1\%}$=38
$\lambda_{max.}$ 273 mµ, $E_{1cm.}^{1\%}$=24.4
$\lambda_{max.}$ 280.5 mµ, $E_{1cm.}^{1\%}$=20.5

This product is not described in the literature.

Step C: *Hydrolysis.*—1 g. of $\Delta^{1(9)}$-3-methyl-7-oxo-8-(3' - chloro - 2' - butenyl) - 3,4-[3' - benzoyloxy - cyclopentano - (2',1')] - octahydronaphthalene (IV, $R=CH_3$, $R_1=C_6H_5CO$, $X=Cl$), having a melting point of 98–99° C. and a specific rotation $(\alpha)_D^{20}=+20.5°$ (methanol) was triturated with 10 cc. of concentrated sulfuric acid. The mixture rapidly became fluid and became a clear orange color. After 5 minutes it was poured into a mixture of water, sodium bicarbonate and ice, then vacuum filtered. The product was $\Delta^{8(9)}$-3-methyl-7-oxo- 8 - (3' - oxo - butyl)3,4 - [3' - benzoyloxy - cyclopentano-(2',1')]-octahydronaphthalene (V, R=CH₃,

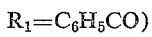

and after recrystallization in isopropyl ether, 0.85 g. of product were recovered, being a yield of 90%. The product had a melting point of 117° C. and a specific rotation $[\alpha]_D^{20} = +43°$ (c.=1% in methanol) and was identical to the product described in U.S. Patent No. 3,050,330.

*Example II*

PREPARATION OF Δ⁸⁽⁹⁾-3 - N - PROPYL - 7 - OXO-8-(3'-OXO-BUTYL) - 3,4 - [3' - BENZOYLOXY-CYCLOPENTANE-(2',1')] - OCTAHYDRONAPHTHALENE (V, R=C₃H₇, R₁=COC₆H₅)

Step A: *Preparation of the enamine.*—0.500 gm. of Δ⁸⁽⁹⁾-3-n-propyl-7-oxo-3,4-[3'-benzoyloxy - cyclopentano-(2',1')]-octahydronaphthalene (IB; R=C₃H₇,

specific rotation $[\alpha]_D^{20} = +26°$ (c.=1% in methanol), prepared according to Example XI of application Serial No. 96,062, were introduced into 1 cc. of pyrrolidine and heated to 80–85° C. for a period of five minutes under an atmosphere of nitrogen. After cooling, 4 cc. of methanol were added. The pyrrolidino - enamine, Δ¹⁽⁹⁾,⁷⁽⁸⁾-3-n-propyl-7-pyrrolidino - 3,4 - [3' - benzoyloxy-cyclopentano - (2',1')] - hexahydronaphthalene (II, R=C₃H₇, R₁=COC₆H₅,

pyrrolidino) started to crystallize. The mixture was agitated for a period of an hour under nitrogen, then several more cc. of methanol were added and the mixture so obtained was allowed to stand for a period of one-half hour at 0°. The product was next vacuum filtered, washed with methanol and dried under vacuum. Compound II, R=C₃H₇, R₁=COC₆H₅,

pyrrolidino was thus obtained having a melting point of 118–119° C. and a specific rotation $[\alpha]_D^{20} = +138°$ (c.=1% in benzene). The product was present in the form of pale yellow needles, very soluble in benzene and chloroform, soluble in acetone, slightly soluble in ether. It was decomposed in water and in dilute aqueous acids or alkalis.

*Analysis.*—C₂₇H₃₅O₂N; molecular weight=405.5. Calculated: C, 79.96%; H, 8.70/; N, 3.45%. Found: C, 79.9%; H, 8.7%; N, 3.2.

Ultraviolet spectra (in ether):

$$\lambda_{max.} \ 229m\mu \ \epsilon=16\ 100$$
$$\lambda_{max.} \ 281m\mu \ \epsilon=26\ 100$$

This compound is not described in the literature.

Step B: *Condensation of the enamine with dichlorobutene.*—0.400 gm. of the enamine, Δ¹⁽⁹⁾,⁷⁽⁸⁾-3-n-propyl-7-pyrrolidino-3,4-[3'-benzoyloxy - cylopentano - (2',1')]-hexahydronaphthalene, II, R=C₃H₇, R₁=COC₆H₅,

pyrrolidino produced according to the preceding step, and 0.190 gm. of potassium iodide were introduced into 3.2 cc. of dimethylformamide. 0.26 cc. of 1,3-dichloro-2-butene were added and the mixture formed was agitated for a period of two hours under an atmosphere of nitrogen at room temperature. About 1 cc. of water was next added, the mixture allowed to stand ten hours at 0° C., then poured into water and extracted with ether. The ethereal extracts, after washing with water, were evaporated to dryness under vacuum. The residue consists predominately of the raw Δ⁸⁽⁹⁾-3-n-propyl-7-oxo-8-(3'-chloro-2'-butenyl)-3,4 - [3' - benzoyloxy - cyclopentano-(2',1')]-octahydronaphthalene, III, R=C₃H₇,

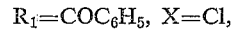

which was purified by chromatography through 80 parts of silica gel. After withdrawing 3.5 to 4% of a first elution with methylene chloride containing 0.2% of acetone, the desired product was eluted with methylene chloride containing 0.4% of acetone. This product was utilized without other purification in the course of the synthesis.

The product, which was present in the form of a colorless oil, was soluble in alcohol, acetone, benzene and chloroform, slightly soluble in isopropyl or ethyl ether, and insoluble in water.

This compound is not described in the literature.

*Step C: Hydrolysis.*—0.380 gm. of Δ⁸⁽⁹⁾-3-n-propyl-7-oxo - 8 - (3'-chloro-2'-butenyl) - 3,4 - [3'-benzoyloxy-cyclopentano-(2',1')]-octahydronaphthalene, III, R=C₃H₇, R₁=COC₆H₅, X=Cl, were dissolved in 0.4 cc. of anhydrous ether, cooled to +5° C., then 3.5 cc. of concentrated sulfuric acid were added. The resultant clear brown solution was poured into a mixture of 150 cc. of a 10% aqueous solution of sodium bicarbonate and 70 cc. of methylene chloride. This mixture was agitated for several minutes, then extracted with methylene chloride. The extracts were washed with water, then dried and evaporated to dryness under vacuum. A gummy product was recovered which comprises Δ⁸⁽⁹⁾-3-n-propyl - 7 - oxo - 8 - (3' - oxobutyl) - 3,4 - [3'-benzoyloxy-cyclopentano - (2',1')] - octahydronaphthalene, V, R=C₃H₇, R₁=COC₆H₅, which was purified by chromatography through 80 parts of silica gel. After withdrawing 9.3% of the product as a first elution with methylene chloride containing 1% of acetone, 82.5% of Δ⁸⁽⁹⁾-3-n-propyl - 7 - oxo - 8 - (3' - oxobutyl) - 3,4 - [3'-benzoyloxy-cyclopentano - (2',1')] - octahydronaphthalene were eluted with methylene chloride containing 1.5% of acetone. The product was present in the form of a colorless oil, soluble in alcohol, acetone, benzene, chloroform, slightly soluble in isopropyl and ethyl ethers, insoluble in water. It was decomposed by dilute aqueous acids or alkalis.

Ultraviolet spectra (in ethanol):

$$\lambda_{max.} \ 238\ m\mu \ E_{1\ cm.}^{1\%} = 511$$
$$\lambda_{max.} \ 250\ m\mu \ E_{1\ cm.}^{1\%} = 417$$

This compound is not described in the literature.

The preceding examples are not to be construed as limiting the invention. It is evident to one skilled in the art that the temperatures, the nature of the solvents, the organic carboxylic acid ester, the secondary amine or the substitution in the 3 position may be varied or that equivalent techniques may be used without departing from the spirit of the invention or the scope of the appended claims.

We claim:
1. An enamine of the formula:

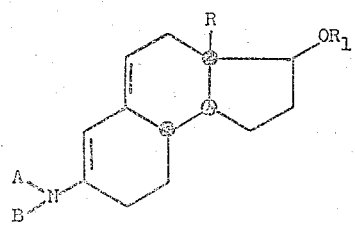

wherein R represents a radical selected from the group consisting of alkyl having from 1 to 18 carbon atoms, alkenyl having from 2 to 6 carbon atoms and phenylalkoxyalkyl having from 8 to 18 carbon atoms, $R_1$ represents a member selected from the group consisting of hydrogen and the acyl radical of an organic carboxylic acid having from 1 to 18 carbon atoms selected from the group consisting of alkanoic, alkenoic, cycloalkylalkanoic, hexahydroterephthalic, phenoxyacetic and phenylalkanoic acids, A and B are selected from the group consisting of alkyl having from 1 to 8 carbon atoms, alkenyl having from 3 to 8 carbon atoms, alkylol having from 2 to 8 carbon atoms and taken together with the nitrogen atom from a member selected from the group consisting of pyrrolidino, piperidino, α-pipecolino, β-pipecolino, γ-pipecolino and morpholino.

2. $\Delta^{1(9),7(8)}$ - 3 - methyl - 7 - pyrrolidino - 3,4 - [-benzoyloxy-cyclopentano-(2′,1′)]-hexahydronaphthalene.

3. $\Delta^{1(9),7(8)}$ - 3 - n - propyl - 7 - pyrrolidno - 3,4 - [3′-benzoyloxy - cyclopentano - (2′,1′)] - hexahydronaphthalene.

4. $\Delta^{1(9)}$ - 3 - methyl - 7 - oxo - 8 - (3′ - chloro - 2′ - butenyl) - 3,4 - [3′ - benzoyloxy - cyclopentano - (2′,1′)]-octahydronaphthalene.

5. $\Delta^{8(9)}$ - 3 - n - propyl - 7 - oxo - 8 - (3′ - chloro - 2′-butenyl) - 3,4 - [3′ - benzoyloxy - cyclopentano - (2′,1′)]-octahydronaphthalene.

6. process for the production of a dione compound of the formula:

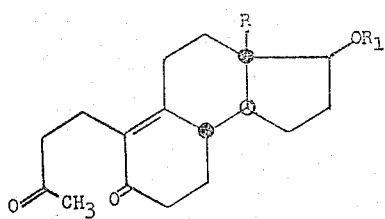

wherein R represents a radical selected from the group consisting of alkyl having from 1 to 18 carbon atoms, alkenyl having from 2 to 6 carbon atoms and phenylalkoxyalkyl having from 8 to 18 carbon atoms, and $R_1$ represents a member selected from the group consisting of hydrogen and the acyl radical of an organic carboxylic acid having from 1 to 18 carbon atoms selected from the group consisting of alkanoic, alkenoic, cycloalkylalkanoic, hexahydroterephthalic, phenoxyacetic and phenylalkanoic acids, which comprises the steps of (A) reacting a compound selected from the group consisting of $\Delta^{9(10)}$ compounds of the formula:

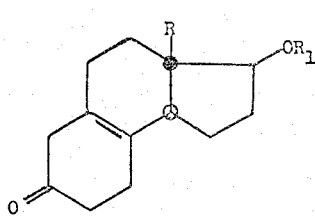

and $\Delta^{8(9)}$ compounds of the formula:

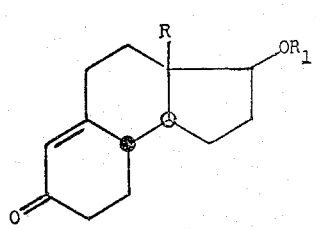

wherein R and $R_1$ have the above assigned values with a secondary amine having the formula

where A and B are selected from the group consisting of alkyl having from 1 to 8 carbon atoms, alkenyl having from 3 to 8 carbon atoms, alkylol having from 2 to 8 carbon atoms and taken together with the nitrogen atom form a member selected from the group consisting of pyrrolidino, piperidino, α-pipecolino, β-pipecolino, γ-pipecolino and morpholino in the presence of an inert organic solvent, (B) condensing the corresponding enamine of the formula:

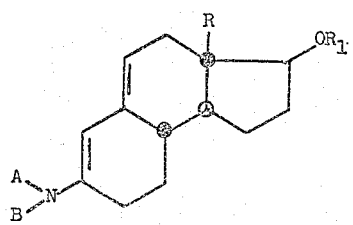

where R, $R_1$, A and B have the above assigned values, with a 1,3-dihalo-2-butene in dimethylformamide at a temperature between about 10° C. and 100° C., (C) hydrolyzing the resulting compound with water, (D) hydrolyzing the resulting intermediate selected from the group consisting of (A) $\Delta^{1(9)}$-3-substituted-7 - oxo - 8 - (3′ - halo - 2′ - butenyl) - 3,4 - [3′-substituted - cyclopentano - (2′,1′)] - octahydronaphthalene compounds of the formula:

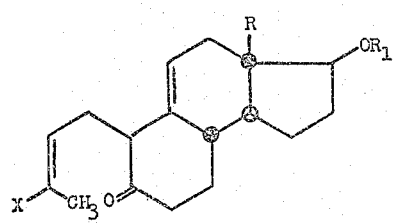

(B) $\Delta^{8(9)}$ - 3 - substituted - 7 - oxo - 8 - (3′-halo-2′-butenyl) - 3,4 - [3′ - substituted - cyclopentano-(2′,1′)] - octahydronaphthalene compounds of the formula:

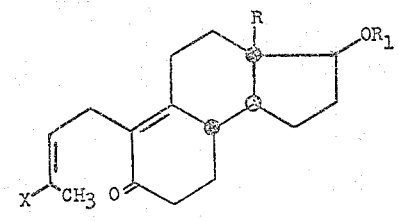

and (C) mixtures of the two isomers, wherein R and $R_1$ have the above assigned values and X represents a halide, by the action of a concentrated aqueous solution of a strong mineral acid at about room temperature, and (E) recovering said dione compound.

7. The process of claim 6 in which said starting compound is $\Delta^{9(10)}$ - 3 - methyl - 7 - oxo - 3,4 - [3′ - benzoyloxy - cyclopentano - (2′,1′)] - octahydronaphthalene.

8. The process of claim 6 in which said starting compound is $\Delta^{8(9)}$ - 3 - n - propyl - 7 - oxo - 3,4 - [3′ - benzoyloxy-cyclopentano-(2′,1′)]-octahydronaphthalene.

9. The process of claim 6 wherein said secondary amine is pyrrolidine and pyrralidino enamine is formed.

10. The process of claim 6 wherein said 1,3-dihalo-2-butene is 1,3-dichloro-2-butene.

11. The process of claim 6 wherein said 1,3-dihalo-2-butene is 1-iodo-3-chloro-2-butene.

12. The process of claim 6 wherein said strong acid is concentrated sulfuric acid.

13. The process of claim 11 wherein said 1-iodo-3-chloro-2-butene is formed in situ by the addition of an iodide selected from the group consisting of sodium iodide and potassium iodide to 1,3-dichloro-2-butene in dimethylformamide.

References Cited in the file of this patent
UNITED STATES PATENTS 3,050,550  Nomine et al. _____ Aug. 21, 1962

IRVING MARCUS, *Primary Examiner.*
NICHOLAS S. RIZZO, WALTER A. MODANCE,
*Examiners.*

UNITED STATES PATENT OFFICE
CERTIFICATE OF CORRECTION

Patent No. 3,168,530                                February 2, 1965

Gerard Nomine et al.

It is hereby certified that error appears in the above numbered patent requiring correction and that the said Letters Patent should read as corrected below.

Column 11, line 10, for "3,050,330" read -- 3,050,550 --; line 13, for "-CYCLOPENTANE-" read -- -CYCLOPENTANO- --; line 5. for "8.70/;" read -- 8.70%; --; column 13, line 17, for "[-ben-" read -- [3′-ben- --; line 28, before "process" insert -- A --; column 14, line 73, for "pyrralidino" read -- pyrrolidino --.

Signed and sealed this 10th day of August 1965.

(SEAL)
Attest:

ERNEST W. SWIDER                                  EDWARD J. BRENNER
Attesting Officer                                        Commissioner of Patents